UNITED STATES PATENT OFFICE.

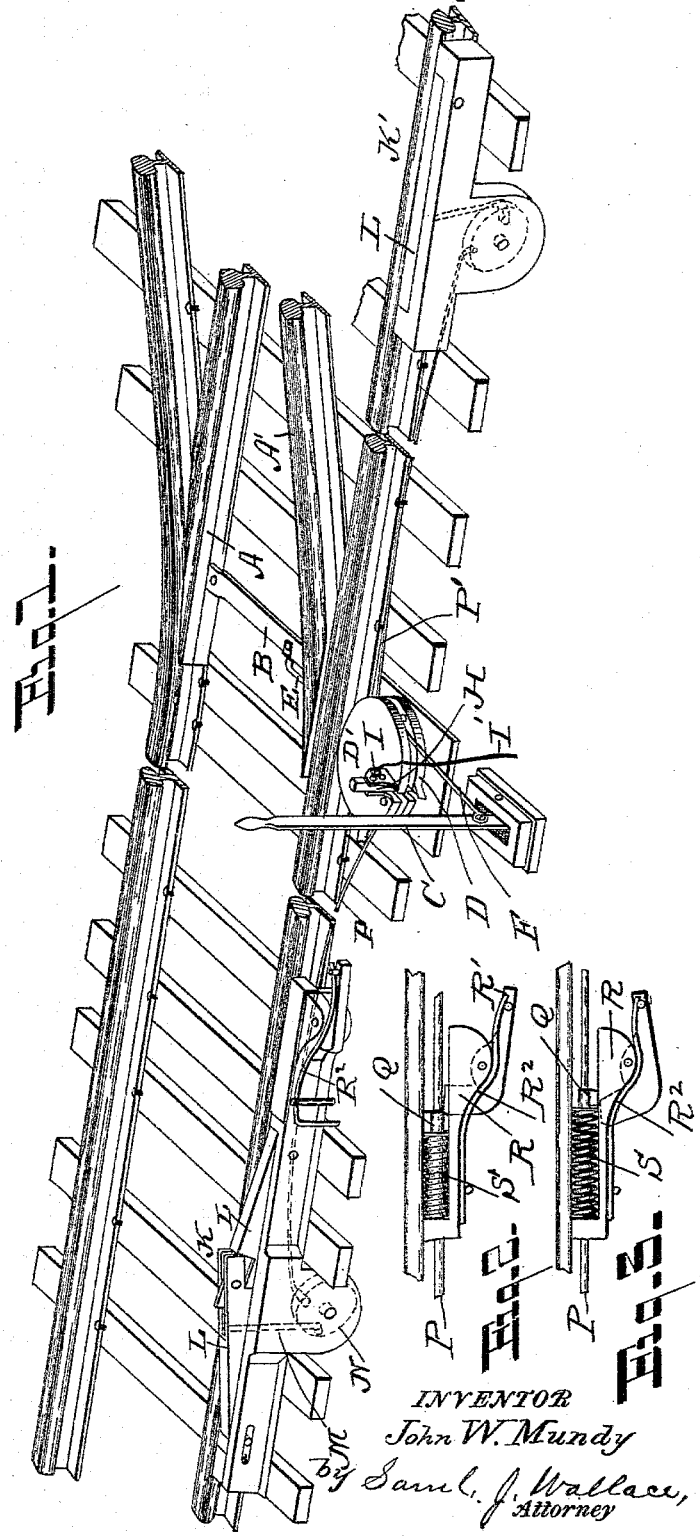

JOHN W. MUNDY, OF KEOKUK, IOWA.

SAFETY-SWITCH.

SPECIFICATION forming part of Letters Patent No. 494,934, dated April 4, 1893.

Application filed July 19, 1892. Serial No. 440,563. (No model.)

*To all whom it may concern:*

Be it known that I, JOHN W. MUNDY, a citizen of the United States, and a resident of Keokuk, in the county of Lee and State of Iowa, have invented a new and useful Improvement in Safety-Switch Mechanism, which is made and used substantially as set forth hereinafter, and as shown in the accompanying drawings, in which—

Figure 1, illustrates the mechanism applied to a railway switch, two considerable parts being removed. Fig. 2, is a view in detail of the latch mechanism engaged. Fig. 3 is a like view of the same disengaged.

The object of this invention is to render railway switches safe, by providing means for automatically setting the switches to receive the approaching trains by the action of the trains themselves while yet at a safe distance away.

The invention consists in a system of parts and features made and arranged to serve this purpose; and in some of the details therein, substantially as set forth hereinafter.

The invention is adapted to operate switches of the usual or any suitable kind, and may be modified in various ways therefor.

Fig. 1 shows a section of railway illustrating the application of the invention. The section is shown broken into three parts to illustrate portions of apparatus at considerable distances apart. The switch shown has the outer rails continuous as parts of the two tracks and the inner rails branching and movable to turn trains onto one track or the other; but the same apparatus would apply where two rails of the main line are movable to turn the trains onto one or the other tracks.

The two rails of the main line diverge apart at the switch and form the external rails of the two branch lines, as shown, and the two inner rails of the branch lines have movable sections A, A', to form the switch. These are held in fixed seats in connection with the fixed parts of the rails, while their free ends are movable, and suitably tapered to fit the outer rails as branches. They are connected by a cross bar B, so as to move together, at a less distance apart than the track rails, so that each alternately may be moved to form part of the track leaving a passage way free at the other side for the wheel flanges to pass.

The switch rails are arranged to be moved by a hand lever C, in the ordinary way. The movement is communicated through bar F, wheel D, and bar E, from lever C, and also by the passing of trains at K, and K', through connections P and P', and wheels D' and D.

At suitable distances from the switch each way on the main line are located mechanisms at K, K', with double or single levers, as shown, to be operated by the wheels of passing trains.

The apparatus at K as shown, has two levers L, L', pivoted to a frame beside the rails at their outer ends, and pivoted together at their inner ends, hinge-like with a cross pivot seated in a slot to admit movement. These levers are arranged to project above the rails as shown so that the car wheels will force them down in passing, to operate the switch. A thrust rod M connects one of these levers with a wheel N below, so as to turn the wheel when forced down, and this wheel has a rod P connected so as to be drawn by the turning of the wheel. These rods are shown by dotted lines, with their crank-like pivots. The rod P passes through a coiled wire spring S, and has a projection Q engaging with the spring so that when the rod is drawn back by wheel N on the passing of a train it will compress the spring so as to return the parts to their places again when released. The projection Q is arranged to be caught by a latch R held by a pivot and a spring R'', when the levers are forced down by a passing train, so as to be held down till the train passes. The latch R has a dog R' by which it can be moved to release the projection Q and let the spring S act to raise the levers and force the rails into the position shown if they should be left otherwise by chance. The rod P connects by a wire extension which runs in bearings located along the sides of the rails with the wheel D', so as to turn it when a train passes over the levers to set the switch. The wheel D' is mounted on the same axle with wheel D, and has a hanging latch lever or dog H, pivoted in a seat between shoulders, so as to hang in a like seat in wheel D, to cause both wheels to turn together. This lever dog is arranged so that it may be lifted or turned out of its seat in wheel D, when it is desired to operate the lower wheel and switch by hand. This is done by pushing back the top end of the lever.

But it may be locked in place for security, by a pin I set in above the pivot and a suitable switch lock. This pin has a chain I' for convenience in withdrawing it. A train passing at K turns the two wheels D', D, and moves the switch rails to open a passage on main line for the train, and the dog R locks the parts in that position, which is that of safety, until the dog R is thrown out to release them. The want of rigidity of the wire connecting rod P with wheel D' allows the parts to act and react at K with passing trains without action at the switch so long as it is set for the main line, while always acting enough to so set the switch for safety automatically if by any reason it should be misplaced.

The apparatus at K', may be like that at K, or as shown, where it is without spring S. and lock dog R, and connects directly with the lower wheel D instead of to wheel D'; but in such case the connection P must be so stiff as to force back enough to lift the lever L, and hold it up. If the distance is too great for this the spring and dog R must be used, and the connection may be by wire, but must be with wheel D' so as to allow the lower wheel to be moved by hand lever C, to run trains onto the siding, or from it. Like apparatus may be located on the siding track, not shown, to open the siding track to the main line to admit trains from the siding, but to run a train onto the siding the hand lever must be used.

Various modifications may be made.

I claim—

1. In a railway switch mechanism the combination of jointed lever L, wheel N, rod P, spring S, catch dog R, wheel D', dog H, wheel D, with seat therein for dog H, hand lever C, rods E, F, and switch rails A, A', arranged for operation substantially as set forth.

2. A safety switch mechanism having a switch and an operative mechanism at a distance therefrom, consisting of a double lever along the track arranged to be operated by a car wheel to change the switch through a single connection having a reset spring thereon adapted to put it back and raise the levers.

3. A safety switch mechanism having at a distance from the switch a lever beside the track and a wheel or bell crank lever connected by a rod from the lever by the track, and connected by a second rod with the switch operating apparatus, and provided with a reset spring adapted to raise and hold the track levers reset after a train has passed.

4. In a switch apparatus the two wheels D, D', with connection with the switch rails and with hand and automatic apparatus connected to operate the switch in alternation, and two connecting rods P, P', having a spring attached to one adapted to reset the apparatus, and a dog latch to hold the spring while a train is passing.

JOHN W. MUNDY.

In presence of—
JOSEPH C. BURK,
EVAN PAPPELENDAN.